(12) United States Patent
Moser et al.

(10) Patent No.: US 10,330,396 B2
(45) Date of Patent: Jun. 25, 2019

(54) FLUID-COOLED HEAT EXCHANGER

(71) Applicant: MAHLE International GmbH, Stuttgart (DE)

(72) Inventors: Michael Moser, Ellwangen (DE); Dominique Raible, Rottenburg (DE)

(73) Assignee: MAHLE International GmbH, Stuttgart (DE)

( * ) Notice: Subject to any disclaimer, the term of this patent is extended or adjusted under 35 U.S.C. 154(b) by 437 days.

(21) Appl. No.: 14/729,374

(22) Filed: Jun. 3, 2015

(65) Prior Publication Data
US 2015/0354905 A1 Dec. 10, 2015

(30) Foreign Application Priority Data

Jun. 5, 2014 (DE) .................. 10 2014 210 800

(51) Int. Cl.
*H01M 2/26* (2006.01)
*F28F 3/12* (2006.01)
*F28F 7/00* (2006.01)
*F28F 21/06* (2006.01)
*H01M 10/65* (2014.01)

(52) U.S. Cl.
CPC ................. *F28F 3/12* (2013.01); *F28F 7/00* (2013.01); *F28F 21/065* (2013.01); *H01M 10/65* (2015.04); *F28F 2280/00* (2013.01)

(58) Field of Classification Search
CPC .... H01M 10/65; F28F 3/12; F28F 7/00; F28F 21/065; F28F 2280/00
See application file for complete search history.

(56) References Cited

U.S. PATENT DOCUMENTS

| | | | |
|---|---|---|---|
| 2010/0116474 A1* | 5/2010 | Kerler | F25B 39/022 165/148 |
| 2011/0020676 A1* | 1/2011 | Kurosawa | B60K 1/04 429/62 |
| 2014/0090813 A1* | 4/2014 | Schmid | F28F 13/06 165/104.19 |

FOREIGN PATENT DOCUMENTS

| | | |
|---|---|---|
| DE | 10313355 A1 | 11/2004 |
| DE | 102012217868 A1 | 4/2014 |
| WO | WO 2014/067757 * 5/2014 | ............... F28F 3/08 |

* cited by examiner

*Primary Examiner* — Raymond Alejandro
(74) *Attorney, Agent, or Firm* — Brinks Gilson & Lione

(57) ABSTRACT

A heat exchanger (1) for tempering of an object (7), in particular of an electric energy reservoir (8), has two components (2, 3), which are interconnected and delimit at least in part a flow compartment (17) for the flow of a tempering fluid. Furthermore, at least one of the components (2, 3) is produced from a composite fiber plastic. Improved handling and/or a more compact design is obtained in that at least one of the components (2, 3) has a depression (9) in which a functional element can be at least partially accommodated.

11 Claims, 1 Drawing Sheet

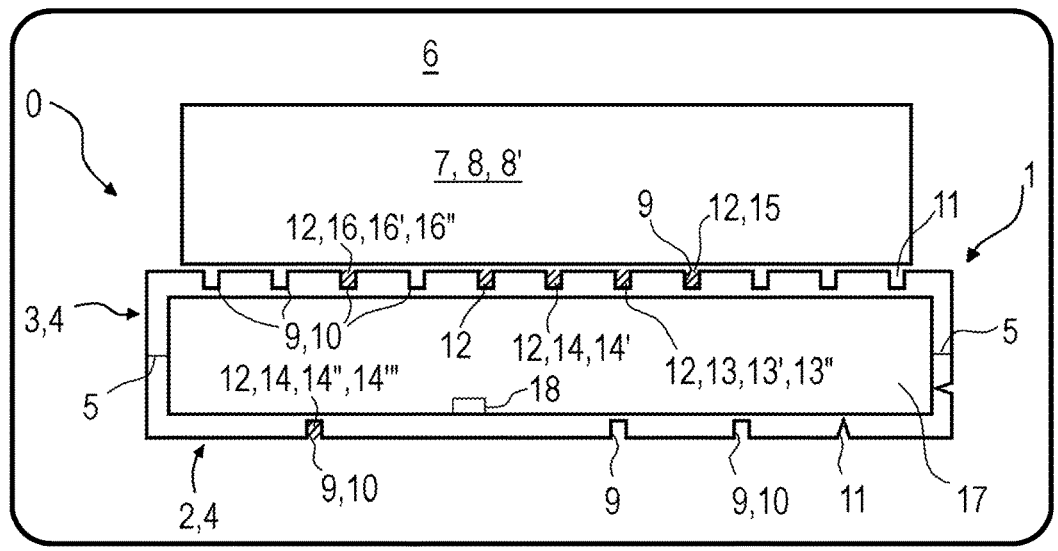
Fig. 1
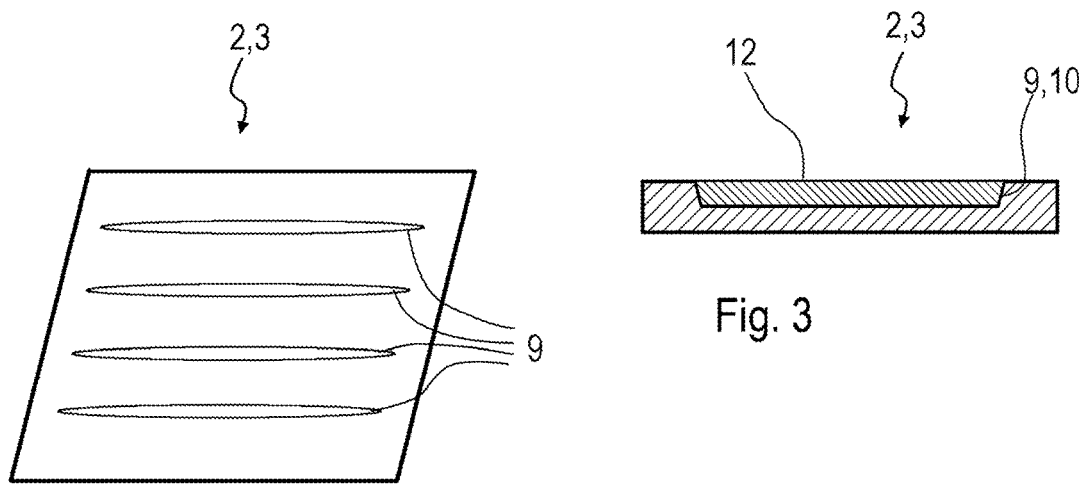
Fig. 2
Fig. 3

FLUID-COOLED HEAT EXCHANGER

TECHNICAL FIELD

The present invention relates to a heat exchanger assembly for tempering an object, including a heat exchanger having a first component and a second component (3) that are interconnected and delimit at least in part a flow compartment for the flow of a tempering fluid. The invention further relates to a component of such a heat exchanger and to a vehicle including such a heat exchanger assembly.

BACKGROUND

Heat exchangers are used in numerous applications for tempering objects. One example of this is the use of heat exchangers in motor vehicles, where frequently tempering of different objects, for example, of an electric energy reservoir, is desired. For this purpose usually heat exchangers are used which are produced from a metal or alloys since metals frequently have an intrinsically high thermal conductance. But in the case of such metals it has proven to be problematic that they require electric insulation during tempering of electrical objects, owing to their electricity conducting properties, in order to prevent undesirable electric currents between the heat exchanger and the object being tempered. Such electrical insulation of the heat exchanger usually requires an additional manufacturing expense as well as the use of additional materials, which increases production costs.

To overcome this disadvantage it is possible to produce heat exchangers from plastic material. But the disadvantage of heat exchangers produced from plastic is their insufficient thermal conductance. This problem can be bypassed by designing the heat exchanger to be as small and thin as possible. However, this manufacturing method then usually results in low mechanical stability of the heat exchanger, so that it is no longer suitable for use in a motor vehicle. Against this background, it is known from DE 10 2012 217 868 A1 how to produce a heat exchanger from composite fiber materials. Thus in this way a thin and yet still stable design of the heat exchanger is possible. Here it proves to be problematic, however, that this thin design offers only very limited possibilities for attachment of functional elements to the heat exchanger and to the object to be tempered.

SUMMARY

Therefore the present invention relates to the problem of specifying an improved or at least different design format for a heat exchanger of the kind cited above, which is distinguished in particular by improved handling, by improved mounting of the heat exchanger and/or of the object to be tempered, as well as by a more compact design.

The present invention is based on the fundamental idea of equipping a component forming a heat exchanger, at least in part, with a depression in which functional elements of the heat exchanger and/or of the object being tempered can be disposed or arranged.

In the present case, a functional element is understood to be any element provided for and/or suitable and/or necessary for the function of the heat exchanger or of the object.

In this manner a simplified arrangement or accommodation or mounting of the stated functional elements is made possible. In addition, the heat exchanger plus functional elements can be designed in a more compact way, so that improved handling and simplified mounting are possible.

Furthermore, the depression provides protection of the functional elements, since they are not exposed. Also, components provided to protect the functional elements, such as strips or casings and such, can be at least partly eliminated.

According to the idea of the invention, the heat exchanger has a first component and second component, which are interconnected and delimit at least in part a flow compartment in which a tempering fluid can flow for tempering of the object. In this regard, at least one of the components, preferably both components, is produced from a composite fiber plastic. In addition, the invention provides that at least one of these components features the depression in which, in turn, a functional element is arranged or can be arranged. The depression here faces away from the flow compartment. That is to say, the depression is arranged on a side of the heat exchanger facing away from the flow compartment.

In principle, the heat exchanger according to the invention is suitable for tempering of any desired object or device. Due to the electrical insulating property of the composite fiber material, the heat exchanger is particularly suitable for tempering of electrically conducting objects, especially objects with an electrically conducting housing. The object may relate, for example, to an electric energy reservoir, in particular to a storage battery or to a battery that is to be installed in a motor vehicle. Thus the heat exchanger can pertain in particular to a heat exchanger for a battery or for a storage battery of a motor vehicle.

The term "tempering" herein is understood to mean any kind of adjustment of the temperature of the object. Thus the heat exchanger can be used both for cooling and for warming and/or heating of the object.

Basically, the particular depression can have any desired shape. In particular, the particular depression can have an elongated, linear, curved, slot-like, or similar shape.

The depression can be configured such that it causes a reinforcement and thus improved stability of the associated component. In particular, it is possible to configure the depression as a kind of ribbing or such, in order to attain increased stability of the component. In this manner it is also possible to reduce the thickness of the components of the heat exchanger, in particular of the at least one component produced from composite fiber plastic and thus to obtain a more compact design.

The particular component can be designed or configured in any desired manner, provided it can be connected to the other component in order to form the heat exchanger. It proves to be especially expedient in this case to use those components that can be provided with such a depression.

It is also quite conceivable to produce the components using a shell construction. In this scenario the particular, first component forms one half-shell, which together with the second component forming the other half-shell, produces the heat exchanger.

In general the components are joined together in any desired manner. Preferred embodiments are those in which the components are firmly bonded to each other, which particularly in the case of components produced from composite fiber plastic, produces a stable and simple bond.

Basically the at least one component produced from composite fiber plastic can be produced from any desired composite fiber plastic. In this case preferably the composite fiber plastic is an endless composite fiber plastic. The endless fibers of the particular layer can be unidirectionally oriented, therefore in particular as "tape", or randomly oriented, especially in glass-mat reinforced thermoplastic (GMT), or oriented in the form of a woven fabric.

Advantageously, the component is produced from an organic sheet, so that it can be easily produced in a known manner at low cost. This construction also makes it possible to equip the component with the depression during production.

In preferred embodiments the depression is produced by a deep drawing method. This allows precise and low-cost production of the component. In particular in the case of components produced from organic sheet it is possible in this manner to produce the component together with its depression.

In principle the depression can be produced by reshaping of the associated component. This means that the depression on one side of the component can result in an elevation on the opposite side of the component.

Particularly preferred are embodiments in which the depression is formed as a recess within the associated component. This means in particular that the depression will not cause any geometric changes on the opposite side of the component. The result is then that the component can have a different, in particular flat, configuration on the side opposite the depression. In this manner a particularly compact and/or planar configuration of the component and/or of the heat exchanger is possible, which results in a reduction of the needed installation space.

In principle, the particular depression can be covered, according to the arrangement of the functional element, wherein the covering can be designed in any desired manner.

The particular depression can have an opening oriented in any desired direction with respect to the flow compartment. For example, in an arrangement with the object and the heat exchanger, this opening can face the object or can face away from the object. Consequently, the functional elements disposed in the depression facing the object can be in contact with the object to be tempered. This can be utilized in order to improve the tempering of the object, in that for example, a heat-conducting element is arranged in such a depression. Thus the heat-conducting element preferably has a thermal conductance that is greater than the thermal conductance of the associated component. The heat-conducting element may pertain to a thermal paste, for example. Also, the heat-conducting element can be provided as an encapsulant, in particular as a silicone encapsulant, which is introduced for example by a pressure method into the associated depression.

Naturally it is also possible to provide such a depression facing away from the object, with a heat-conducting element such that for example heat exchange is improved between the heat exchanger and adjacent components and/or the environment.

Such a depression can also be used to accommodate a mounting element used for mounting and bonding. The mounting element can in particular be an adhesive material. The adhesive material can be provided in particular to produce a bond with the object. In this case the contact between the adhesive material and the object is created preferably at points or in a line. Accordingly, the associated depressions can have a point-form or linear configuration.

In addition, such a functional element can be a sensor, which identifies the operating states of the object and/or of the heat exchanger and/or of the environment. In particular such a sensor can be provided that identifies the temperature of the object. A temperature sensor of this kind is arranged preferably in a depression directed toward the object, so that it can determine the temperature of the object. In this manner in particular the temperature sensor can be in direct contact with the object.

Such a functional element can also be a tempering element that tempers the object as needed. Such a tempering element can thus heat and/or cool the object. Accordingly, the functional element can be to a heating element and/or to a cooling element. In this case, heating elements can be used that are designed as a cold conductor, especially as a PTC-stone, where PTC stands for "Positive Temperature Coefficient."

Obviously the heat exchanger can also have connectors that are used for circulation of a tempering fluid, a coolant, for example, for tempering of the object.

It is also obvious that the particular component can have two or several such depressions, which each are oriented toward or away from the object. In addition both components can have such depressions.

It is conceivable to design the components as non-variable components. This leads to a reduction in production costs. In this case such a component can have several such depressions, which can have the same or different shapes and/or sizes. In addition the component can feature the depressions with different orientations.

Obviously such a component, which forms the heat exchanger and has at least one such depression, is also covered by the present invention.

Other important features and advantages of the invention are evident from the drawings, and from the associated description of figures with reference to the drawings.

It is noted that the features named above and to be explained below can not only be used in the particular, stated combination, but may also be used in other combinations or individually, without departing from the scope of the present invention.

Preferred exemplary embodiments of the invention are represented in the illustrations and are explained in greater detail in the following description, wherein the same reference symbols refer to the same or to similar or to functionally equivalent components.

BRIEF DESCRIPTION OF THE DRAWINGS

The schematic figures are described below:

FIG. 1 shows a cross section through an arrangement with a heat exchanger and an object.

FIG. 2 shows a three-dimensional view of a component of the heat exchanger.

FIG. 3 shows a longitudinal cross section through a component of the heat exchanger.

DETAILED DESCRIPTION OF THE DRAWINGS

FIG. 1 shows a cross section through an arrangement 0, which is a component of a motor vehicle 6. The arrangement 0 comprises a heat exchanger 1 and an object 7, which can be tempered by the heat exchanger 1. The heat exchanger 1 has a first component 2 and a second component 3, which are made from composite fiber plastic. Components 2, 3 are each designed as a half shell and are connected to one another by a bond 5.

The components 2, 3 delimit a flow compartment 17 in which a tempering fluid, in particular a coolant, can flow for tempering of the object 7. Object 7 is an electric energy reservoir 8, for example, in particular a storage battery 8' of the motor vehicle 6. In the present case the object 7 is arranged on/at the upper component 3 in FIG. 1.

The particular component 2, 3 has at least one depression 9, wherein the particular depression 9 is designed as a recess 10 formed inside the associated component 2, 3. The term "recess" in this context indicates a locally reduced thickness of the wall of the component, while the term "depression" additionally includes space created by mere deformation of the wall, for example a dent.

In addition, the particular depression 9 is arranged on a side of the associated component 2, 3 facing away from the flow compartment 17, and thus faces away from the flow compartment 17. The particular depression 9 has an opening 11. In this case the upper component 3 shown in FIG. 1 has 11 depressions 9, purely by way of example, whereas the lower component 2 in FIG. 1 has five depressions 9, purely by way of example.

The openings 11 in the depressions 9 of the upper component 3 all face the object 7. Thus these depressions 9 are oriented toward the object 7. One the other hand, in the shown example the lower component 2 has only depressions 9 whose openings 11 face away from the object 7. Thus, these depressions 9 are oriented away from the object 7.

A functional element 12 can be introduced through the opening 11 into the particular depression 9 and can be disposed therein. The functional element 12 arranged in such a depression 9 oriented toward the object 7 can thus be brought mechanically and thermally into contact with the object 7 to be tempered.

In the case of functional element 12, this can be for example a heat-conducting element 13, in particular a thermal paste 13' or to a silicone encapsulant 13", which has a greater thermal conductivity than the associated component 2, 3 produced from composite fiber plastic. Accordingly, with the aid of the heat-conducting element 13, the heat exchange with the object 7 can be improved. In such a depression 9 oriented toward the object 7, a mounting element 14 can also be disposed, which used for mounting and/or bonding of the object 7. For example, the mounting element 14 itself can be an adhesive 14'.

On the other hand, the functional element 12 disposed in a depression 9 oriented away from the object 7 has no direct mechanical or thermal contact with the object 7. Therefore a mounting element 14 can be arranged preferably in such a depression 9, which connects the heat exchanger 14 with other components that are not part of the heat exchanger. In this regard, a spring 14" or a connecting element 14''', for example, can be used.

In addition, such a functional element 12 can be designed as a sensor 15, which identifies the temperature of the object 7 and/or of the heat exchanger 1. To improve the temperature identification of the object 7, it is advantageous if the sensor 15 is provided in such a depression 9 oriented toward the object 7.

A depression 9 of this kind can also be designed for a functional element 12 configured as a tempering element 16, which cools or heats the object 7. Thus such a tempering element 16 can be a cooling element 16' or a heating element 16".

The depressions 9 of the upper component 3, purely by way of example, each have the same rectangular cross section and the same size. In addition these depressions 9 are equidistant from one another. This allows uniform heat exchange with the object 7, in particular when the heat conduction elements 13 are arranged in these depressions 9. Three depressions 9 of the lower component also have a rectangular cross section, whereas the other two depressions 9 have a wedge-like cross section.

The depressions 9 are dimensioned and/or are shaped such that they are suitable for the arrangement of the particular, associated functional element 12. Here the particular depression 9 and the associated functional element 12 are designed preferably such that the functional element 12 at least partly fits flush with the associated component 2, 3.

FIG. 2 show one such component 2, 3, which has elongated depressions 9 running in parallel. In this embodiment the depressions 9 are disposed equidistantly from one another and have the same geometric shape and size.

FIG. 3 shows another exemplary embodiment of such a component 2, 3, in which the depression 9 has a trapezoidal cross section and is designed as a recess 10 inside the component 2, 3.

The embodiments of FIGS. 1, 2, and 3 may be combined with the shapes of one or more of the other embodiments from different viewing angles.

For circulation of the tempering fluid in the flow compartment 17, the heat exchanger 1 can have at least one inlet (not shown) as well as at least one outlet (not shown in the figures). Furthermore, as illustrated in FIG. 1, diverter elements 18 can be provided in the flow compartment to control the tempering fluid and to generate turbulence in the tempering fluid.

While the above description constitutes the preferred embodiments of the present invention, it will be appreciated that the invention is susceptible to modification, variation and change without departing from the proper scope and fair meaning of the accompanying claims.

The invention claimed is:

1. A heat exchanger assembly for tempering of an object (7), comprising a heat exchanger (1) having a first component (2) and a second component (3), wherein
the first component (2) and the second component (3) are interconnected and delimit at least in part a flow compartment (17) for the flow of a tempering fluid,
at least one of the first component (2) and the second component (3) is a composite fiber plastic part with an inner surface oriented toward and delimiting the flow compartment and an outer surface oriented away and remote from the flow compartment, the outer surface having a depression (9) in a planar portion of the outer surface, the depression having a perimeter being bordered along the entire perimeter by the planar portion of the outer surface, the depression accommodating at least a portion of a functional element (12),
wherein the functional element is a member of the group consisting of: a heat-conducting element of higher thermal conductivity than the composite fiber plastic part, a temperature sensor, a heating element, a cooling element, and a mounting element for connecting the heat exchanger with the object that is not part of the heat exchanger, the functional element being accommodated in the depression and at least partly fitting flush with the planar portion of the outer surface.

2. The heat exchanger assembly according to claim 1, wherein the depression (9) is a recess (10) within the at least one of the first component (2) and the second component (3).

3. The heat exchanger assembly according to claim 1, wherein the depression (9) is produced by a deep drawing method.

4. The heat exchanger assembly according to claim 1, wherein the functional element is a thermal conducting element (13) whose thermal conductance is greater than the thermal conductance of the associated first or second component (2, 3).

5. The heat exchanger assembly according to claim 1, wherein the functional element fits flush against the planar portion of the outside surface.

6. The heat exchanger assembly according to claim 1, wherein the functional element is a mounting element (14)

for mounting at least one of the heat exchanger (1) and the object (7), which is not part of the heat exchanger.

7. The heat exchanger assembly (0) according to claim 1, further comprising
an electric energy reservoir (8) disposed at the heat exchanger (1) and forming the object to be tempered.

8. The heat exchanger assembly (0) according to claim 7, wherein the electric energy reservoir is a storage battery (8').

9. A vehicle (6) comprising a heat exchanger assembly having
an electric energy reservoir (8) and
a heat exchanger (1) having a first component (2) and a second component (3),
wherein the first component (2) and the second component (3) are interconnected half shells and delimit between the first component and the second component at least in part a flow compartment (17) for the flow of a tempering fluid, and
wherein at least one of the first component (2) and the second component (3) is a composite fiber plastic part that has a depression (9) in a surface oriented away from and outside of the flow compartment (17), the depression (9) being surrounded by a planar portion of the surface and accommodating at least a portion of a functional element (12), the functional element being a member of the group consisting of: a heat-conducting element of higher thermal conductivity than the composite fiber plastic part, a temperature sensor, a heating element, a cooling element, and a mounting element for connecting the heat exchanger with an object that is not part of the heat exchanger, wherein the functional element is accommodated in the depression and at least partly fits flush with the planar portion of the surface.

10. A component (2, 3) for a heat exchanger (1), wherein the component (2, 3) is a composite fiber plastic part and configured as a half shell with an inside surface delimiting at least in part a flow compartment (17) for the flow of a tempering fluid, the component (2, 3) comprising at least one depression (9) on an outside surface oriented away from the flow compartment, the depression being separated from the flow compartment by the composite fiber plastic part and configured for accommodating at least a portion of a functional element (12), the outside surface configured to be an outside surface of the heat exchanger, the functional element being a member of the group consisting of: a heat-conducting element of higher thermal conductivity than the component, a temperature sensor, a heating element, a cooling element, and a mounting element for connecting the heat exchanger with an object that is not part of the heat exchanger, wherein the depression is configured to place the functional element in contact with an object (7) disposed outside of and adjacent to the heat exchanger.

11. The component according to claim 10, wherein the at least one depression (9) is a recess (10) within the component (2, 3).

* * * * *